United States Patent [19]
Parry et al.

[11] Patent Number: 5,785,391
[45] Date of Patent: Jul. 28, 1998

[54] WHEEL ADAPTER

[75] Inventors: Alan C. Parry, 1974 365th St., Earlham, Iowa 50072; John H. Kite, Urbandale, Iowa

[73] Assignee: Alan C. Parry, Earlham, Iowa

[21] Appl. No.: 761,322

[22] Filed: Dec. 10, 1996

[51] Int. Cl.$^6$ .................................................. B60B 27/00
[52] U.S. Cl. ...................................... 301/111; 301/35.62
[58] Field of Search .................... 301/5.1, 6.1, 35.62, 301/36.1, 38.1, 111, 35.54, 35.58

[56] References Cited

U.S. PATENT DOCUMENTS

| | | | |
|---|---|---|---|
| 3,649,079 | 3/1972 | English | 301/35.62 |
| 3,820,851 | 6/1974 | Longo et al. | 301/35.62 |
| 3,834,766 | 9/1974 | Thousand | 301/35.54 X |
| 4,135,765 | 1/1979 | Hardwicke . | |
| 4,585,276 | 4/1986 | Tirheimer | 301/35.62 X |
| 4,699,431 | 10/1987 | Daberkoe . | |

FOREIGN PATENT DOCUMENTS 2100680  1/1983  United Kingdom ............... 301/35.62

*Primary Examiner*—Russell D. Stormer
*Attorney, Agent, or Firm*—Zarley, McKee, Thomte, Voorhees, & Sease

[57] ABSTRACT

A wheel adapter for mounting a wheel on a vehicle having a plurality of wheel mounting studs arranged in a bolt circle of a given diameter on a wheel hub, the wheel having a plurality of holes arranged in a bolt circle of a diameter substantially different from the given diameter. The wheel adapter includes an adapter plate having a plurality of holes therethrough in a bolt circle. The holes are adapted to respectively receive the wheel mounting studs. The wheel adapter further includes a plurality of studs protruding from the adapter plate and arranged so as to extend through at least some of the holes in the wheel. The studs on the adapter plate are arranged in a bolt circle having a substantially different diameter than the bolt circle of holes in the adapter plate. A raised circular flange on the adapter plate is interposed between the studs and the holes.

16 Claims, 2 Drawing Sheets

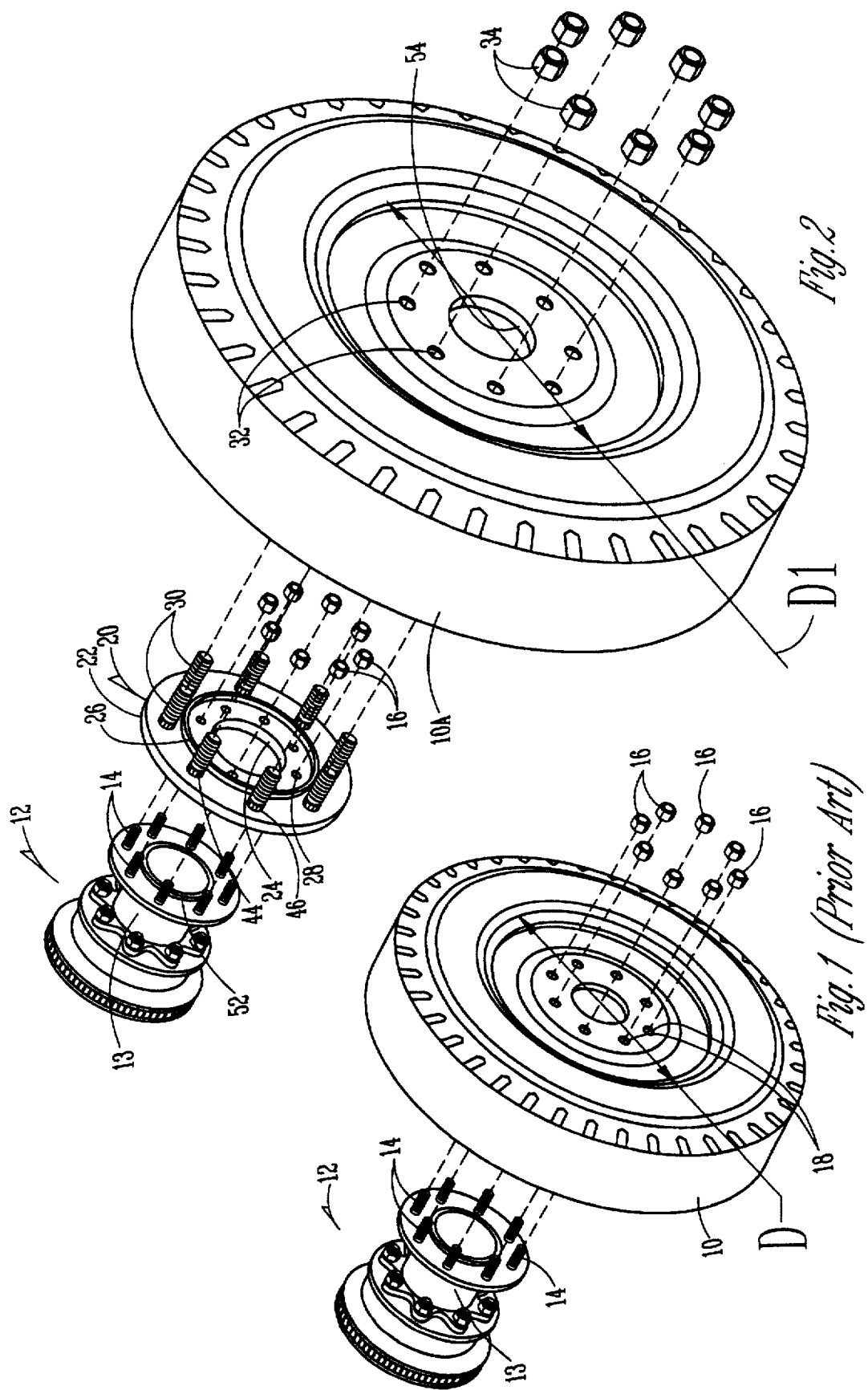

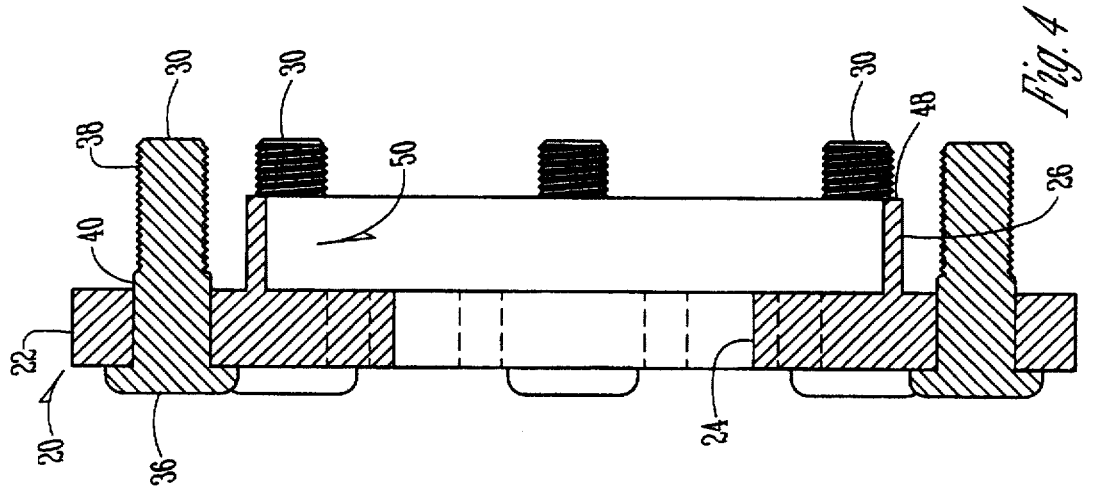
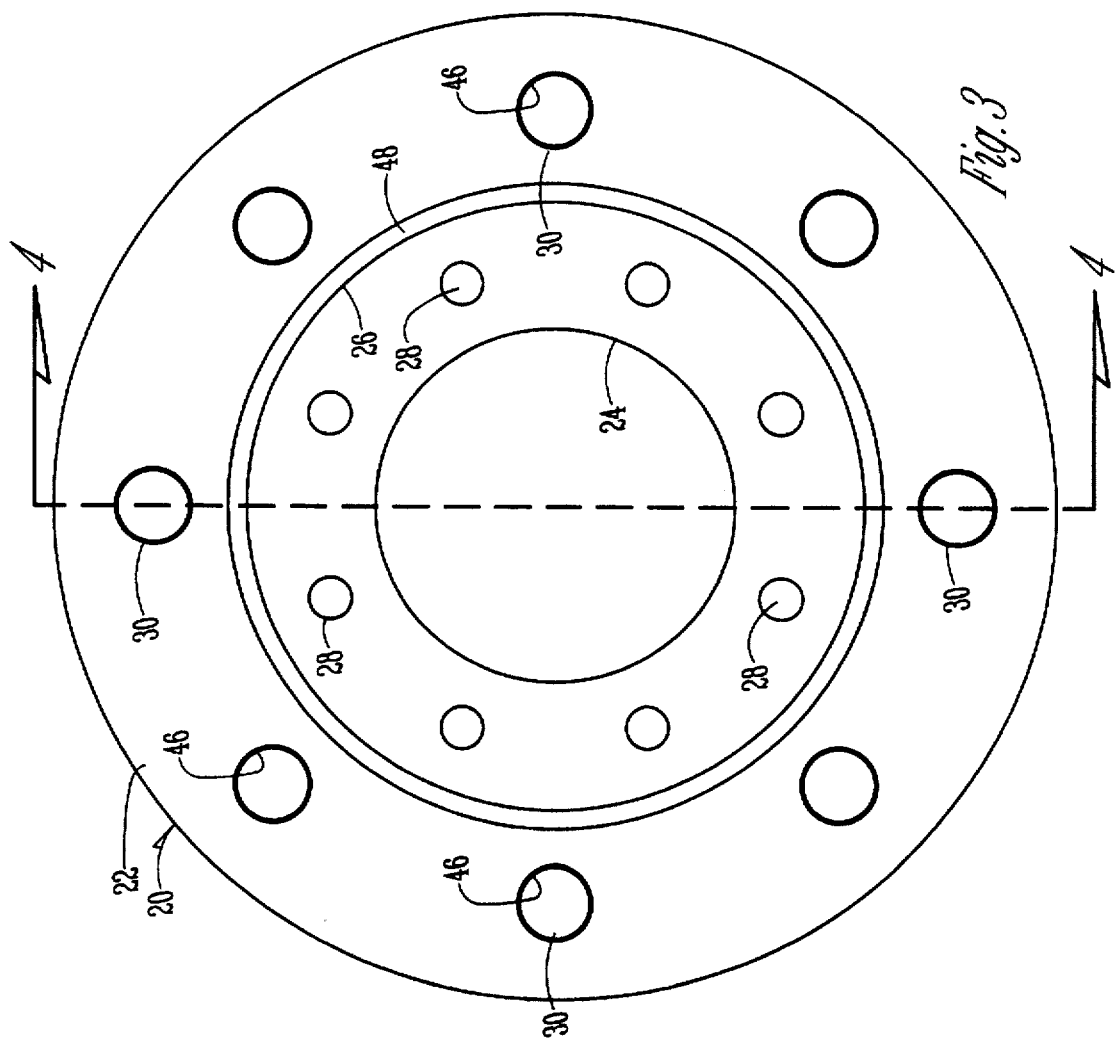

WHEEL ADAPTER

BACKGROUND OF THE INVENTION

The present invention relates to mounting wheels on vehicles, including but not limited to trucks, automobiles and the like. More particularly, this invention relates to a wheel adapter for mounting a wheel of a second size on a wheel hub normally equipped with a wheel of a first size.

Various wheel adapters are known in the automotive art. Some of these wheel adapters allow an additional wheel to be installed on the wheel hub, thus making a single wheel into a dual wheel. Other conventional wheel adapters allow the user to change from a five-bolt, four inch bolt circle wheel to a five-bolt, five inch bolt circle wheel, for example. However, these conventional wheel adapters cannot increase or decrease the bolt circle diameter by more than about one inch. This means that the original wheel and the new wheel must be nearly identical with respect to size and diameter. Thus, one cannot capitalize on the substantial increase in torque and traction that generally accompanies the use of a much larger wheel. Heretofore, a means has not been developed to make a wheel of substantially different size interchangeable with the given size wheel mounted on a wheel hub. Thus, there is a need for a wheel adapter that is an improvement over the prior art.

Therefore, the primary object of the present invention is the provision of a wheel adapter which is an improvement over the prior art.

A further object of the present invention is the provision of wheel adapter which gives one the option to mount on a wheel hub a wheel of substantially different size than the wheel originally supplied on the wheel hub.

Another object of this invention is the provision of a wheel adapter that has a raised circular flange thereon which forms a pocket for fully recessing the studs and lug nuts mounting the adapter to the wheel hub.

These and other object will be apparent from the drawings, specification and claims which follow.

SUMMARY OF THE INVENTION

A wheel adapter for mounting a wheel on a vehicle having a plurality of wheel mounting studs arranged in a bolt circle of a given diameter on a wheel hub, the wheel having a plurality of holes arranged in a bolt circle of a diameter substantially different from the given diameter. The wheel adapter comprises an adapter plate having a plurality of holes therethrough in a bolt circle and adapted to respectively receive the wheel mounting studs. The wheel adapter also includes a plurality of studs protruding from the adapter plate and arranged so as to extend respectively through at least some of the holes in the wheel. The studs on the adapter plate are arranged in a bolt circle having a substantially different diameter than the bolt circle of holes in the adapter plate. A raised circular flange on the adapter plate is interposed between the studs and the holes.

BRIEF DESCRIPTION OF THE DRAWINGS

FIG. 1 is an exploded perspective view of a conventional system for mounting a wheel to the wheel hub of a vehicle.

FIG. 2 is an exploded perspective view of the wheel adapter system of the present invention.

FIG. 3 is a front plan view of the wheel adapter of this invention.

FIG. 4 is cross-sectional view of the wheel adapter taken along line 4—4 in FIG. 3.

DETAILED DESCRIPTION OF THE PREFERRED EMBODIMENT

A conventional system for mounting a wheel 10 on the wheel hub 12 of a vehicle is shown in FIG. 1. A plurality of threaded wheel mounting studs 14 protrude from an extender 13 attached to the wheel hub 12 and are arranged in a bolt circle of a given diameter. A corresponding number of lug nuts 16 are provided to threadedly engage the protruding studs 14 after they have been inserted through the plurality of holes 18 in the wheel 10. Thus, the lug nuts 16 secure the wheel 10 to the wheel hub 12.

The particular wheel hub 12 shown in FIG. 1 is currently available as original front wheel equipment on one ton and one-and-one-quarter ton Dodge, Chevrolet, Ford and GMC trucks. Eight 9/16-18 Unified National Fine (UNF) studs 14 are arranged in a 6.5 inch bolt circle on the wheel hub 12. The studs 14 extend through corresponding clearance holes 18 in the wheel 10. Then, lug nuts 16 can be attached to the studs 14 to secure the wheel 10 to the wheel hub 12. On the above-mentioned trucks, the original equipment wheel 10 has a nominal size or rim diameter D of approximately sixteen inches.

FIG. 2 shows the adapter 20 of the present invention juxtapositioned and registered with the wheel mounting studs 14 on the front wheel hub 12 of a one ton or one-and-a-quarter ton Dodge, Chevrolet, Ford or GMC truck. As best seen in FIGS. 3 and 4, the adapter 20 comprises a substantially flat, circular adapter plate 22 which has a central opening 24 and a raised circular flange 26. The plate 22 is constructed of a strong, rigid material such as steel or cast iron. A plurality of clearance holes 28 are provided through the adapter plate 22. In the illustrated embodiment, the adapter plate 22 preferably has eight clearance holes 28 arranged equally spaced in a 6.5 inch diameter bolt circle in order to receive the wheel mounting studs 14 as shown in FIG. 2.

Referring again to FIGS. 3 and 4, a plurality of studs 30 protrude from the adapter plate 22. Preferably there are eight studs 30 equally spaced in a 275 millimeter (10.827 inch) diameter bolt circle. The studs 30 preferably have M22 ×2.5 threads thereon and are of sufficient length to extend through the holes 32 and provide the necessary engagement with the lug nuts 34 (see FIG. 2). The studs 30 can be integrally formed with the adapter plate 22 or they can be separate components, each having a low profile head 36 opposite its threaded end 38. The intermediate portion 40 of the stud 30 has an enlarged diameter 42 with serrations 44 thereon. The threaded portion of the stud 30 is passed through holes 46 in the adapter plate 22. One then applies an axial force to the head 36 of the stud 30 until the serrated intermediate portion 40 is press fitted into the holes and the head 36 engages the back of the adapter plate 22.

Although some offset can be introduced without detracting significantly from the invention, the holes 28 preferably extend through the adapter plate 22 concentrically to the studs 30 and stud holes 46. The holes 28 are also radially indexed from the stud holes 46 to ensure adequate wall thickness for the desired strength and rigidity. The holes 28, 46 and the flange 26 are arranged concentrically with respect to the central opening 24.

The flange 26 protrudes in substantially the same direction as the studs 30. As is best understood from FIGS. 2 and 4, the top face 48 of the flange 26 is raised far enough from the front face of the adapter plate 22 to form an annular pocket 50 for fully recessing the nuts 16 and any protrusion of the studs 14 therethrough. The wheel or hub mounting studs 14 extend through the holes 28 and the adapter to engage the lugnuts 16. The studs 30 also extend through the adapter 20, preferably parallel to the studs 14. In FIG. 4, the studs 30 are understood to axially overlap the studs 14 that are axially insertable into the holes 28. The holes 28 are indicated by the dashed lines. One will note that the studs 14, 30 are at least partially registered with each other in a radial direction because of the axial overlap. This axial overlap results in less protrusion of the converted wheel package.

The central opening 24 slidingly receives the pilot flange 52 of the wheel hub 12. Thus, the adapter 20 is guided and located in a vertical plane by the pilot flange 52. The wheel mounting studs 14 then radially locate the adapter 20.

The adapter 20 of the present invention provides mounting studs 30 on which a conventional wheel 10A having a 19.5 inch diameter D1 rim and eight mounting holes 32 arranged on a 275 mm bolt circle can be mounted using conventional swivel flange lug nuts 34. The flange 26 can also radially locate or pilot the rim onto the adapter 20.

In use, one removes the lug nuts 16 from the mounting studs 14 and thereafter pulls the wheel 10 of the rim having diameter D free from the wheel hub 12. Next, the user juxtapositions the adapter 20 (with studs 30 preinstalled therein) with respect to the wheel hub 12 so that the holes 28 register with the studs 14. The adapter 20 then slides over the studs 14 until the adapter 20 engages the wheel hub 12. The flange 52 on the wheel hub 12 pilots the adapter 20 by slidingly engaging the central opening 24. The user installs the lug nuts 16 on the studs 14 and tightens them down on the studs 30 in a conventional manner until the adapter 20 is tightly secured for rotation with the wheel hub 12. At this point, the lug nuts 16 and studs 14 are effectively recessed within the circular flange 26 of the adapter 20.

The user then juxtapositions a wheel 10A, which has the desired rim diameter D1, number of mounting holes, and bolt circle diameter, with the adapter 20 so the studs 30 register with the mounting holes 32. Next the user slides the wheel 10A over the studs 30 and the flange 26 until it engages the adapter plate 22. Then the user installs the lug nuts 34 on the studs 30 and tightens the lug nuts 34 in a conventional manner to secure the wheel 10A for rotation with the adapter 20 and thereby the wheel hub 12. The wheel 10A is of the type referred to in the art as a "semi" wheel because of its common usage on semi tractors and trailers.

Those skilled in the automotive art will appreciate that the original rear wheel equipment on the above-mentioned trucks is substantially identical to FIG. 1, but a drum brake is generally provided instead of the disk brake shown. Furthermore, an extender is not required because the width of the brake drum provides enough lateral extension for the wheel hub 12 and the studs 14. Thus, those skilled in the art will appreciate that, although an adapter for the front wheel of a vehicle is illustrated, the present invention is also applicable to the rear wheels of a vehicle. Furthermore, the present invention can be applied to other high load carrying capacity wheels with eight or more mounting studs. For example, the adapter can easily be modified and proportioned to mount wheels having ten mounting holes in a 285.75 mm (11.25 inch) bolt circle. Such wheels typically have the same size central opening 54 as the 275 mm (10.827 inch) bolt circle wheels.

Whereas the present invention has been shown and described in connection with the preferred embodiment thereof, it will be understood that many changes in proportion, modifications, substitutions, and additions may be made which are within the intended broad scope of the following claims. From the foregoing, it can be seen that the present invention accomplishes at least all of the stated objectives.

What is claimed is:

1. A wheel adapter for mounting a wheel on a vehicle having a plurality of wheel mounting studs arranged in a bolt circle of a given diameter on a wheel hub, the wheel having a plurality of holes arranged in a bolt circle of a diameter substantially different from the given diameter, comprising:

an adapter plate having a plurality of holes therethrough in a bolt circle, the holes through the adapter plate being adapted to respectively receive the wheel mounting studs;

a plurality of studs protruding from the adapter plate and arranged so as to extend respectively through at least some of the holes in the wheel, the studs on the adapter plate being arranged in a bolt circle having a substantially different diameter than the bolt circle of holes in the adapter plate;

a raised circular flange protruding outwardly from the adapter plate substantially parallel to the studs protruding from the adapter, the flange being concentrically interposed between the holes and the studs in the adapter plate; and the flange having a top face which is raised so as to accommodate a lug nut between the top face of the flange and the adapter plate.

2. The wheel adapter of claim 1 wherein the studs protrude outwardly from the adapter plate and farther than the flange.

3. The wheel adapter of claim 1 wherein the studs on the adapter are arranged in a bolt circle that has a diameter greater than the bolt circle of the holes in the adapter.

4. The wheel adapter of claim 1 wherein the plurality of studs protruding from the adapter plate comprises eight studs.

5. The wheel adapter of claim 1 wherein the plurality of holes through the adapter plate comprise eight mounting stud receiving holes.

6. The wheel adapter of claim 1 wherein the studs on the adapter plate are threaded.

7. The wheel adapter of claim 1 wherein the studs on the adapter plate are radially indexed with respect to the plurality of holes through the adapter plate.

8. The wheel adapter of claim 1 wherein the bolt circle of the studs on the adapter plate and the bolt circle of the holes in the adapter plate are concentric with each other.

9. The wheel adapter of claim 1 wherein the adapter plate includes a central opening therein.

10. The wheel adapter of claim 9 wherein the bolt circle of holes in the adapter plate is concentric with the central opening.

11. The wheel adapter of claim 9 wherein the bolt circle of the studs on the adapter plate is concentric with the central opening.

12. The wheel adapter of claim 1 wherein the adapter plate has stud holes therein and the studs are press fitted into the stud holes.

13. The wheel adapter of claim 12 wherein each stud includes a low profile head at one end, a threaded portion at another end, and an intermediate portion having serrations thereon for grippingly engaging the adapter plate and impeding movement of the stud with respect to the corresponding hole in the adapter.

14. The wheel adapter of claim 1 wherein the given diameter is approximately 6.5 inches and both the bolt circle of wheel and the bolt circle of the holes through the adapter are approximately 275 millimeters in diameter.

15. The wheel adapter of claim 1 wherein the given diameter is approximately 6.5 inches and both the bolt circle of wheel and the bolt circle of the holes through the adapter are approximately 285.75 millimeters in diameter.

16. The wheel adapter of claim 1 wherein the studs on the adapter plate overlap axially with the wheel mounting studs.

* * * * *